UNITED STATES PATENT OFFICE 2,391,850

NUTRITIONAL PREPARATIONS AND PROCESS

Arnold D. Welch, Overbrook Hills, and Lemuel D. Wright, Edgewood Park, Pa., assignors to Sharp & Dohme, Incorporated, Philadelphia, Pa., a corporation of Maryland No Drawing. Application June 3, 1944, Serial No. 538,710

9 Claims. (Cl. 99—11)

This invention is concerned with nutritional and comestible materials and more particularly to the folic acids content of such materials. The invention relates to the treatment of such materials containing folic acids to increase the available folic acids content thereof and to prevent the destruction of folic acids in the preparation of such substances for consumption by man and other animals. The method of the invention includes the treatment of the indicated starting materials with a substance such as xanthopterin or uropterin to accomplish the desired end. Also included in the invention are the resultant nutritional, comestible materials with enhanced available folic acids content.

In the extended research conducted in recent years on the use of vitamins in the nutrition of man and other animals for improving their general health and avoiding nutritional or metabolic deficiencies, it has been indicated that the vitamin materials called the folic acids, including "folic acid" or vitamin Bc, or "Norite" eluate factor, are beneficial as constituents in the diet of man and other animals. Incidentally, it has also been shown that "folic acid" is an essential growth factor for microorganisms, for example, for the growth of the tetanus organism.

It has also been observed that while the folic acids are widely distributed among the various types of animal (including also eggs and milk) and vegetable (including also fruits and nuts) foodstuffs or comestibles consumed by man and other animals, the quantity of available "folic acid" is low. The folic acids, including "folic acid" or vitamin Bc, or "Norite" eluate factor, are quite unstable and readily destroyed, for example, in many cases up to even 96%, in the preparation or cooking of such edible materials. The unit employed in expressing the "folic acid" content of a material is the microgram, for brevity commonly referred to as the gamma. Raw spinach shows a total "folic acid" content averaging around 170 gamma per gram. After cooking, for example, for the preparation of canned spinach, the content is reduced to around 27 gamma per gram, or a loss of 84%.

According to the invention, it has been found that if, before they are to be used, the nutritive or comestible materials are treated with a substance such as xanthopterin or uropterin, the available folic acids or "folic acid" content thereof is surprisingly increased and the destruction of such unstable vitamin factor or factors in the preparation of the material for consumption is markedly or wholly prevented.

For example, it has been found that when liver is incubated with synthetic xanthopterin, more "folic acid" is found after microbiological assay than can be accounted for on the basis of the "folic acid" content of the liver alone.

Thus, the invention may be illustrated by, but not restricted to, the following example:

Example—Influence of xanthropterin on the "folic acid" available from liver.—10 grams of fresh, raw beef liver showing an original "folic acid" content of 0.33 gamma per gram, were homogenized in a Waring blender with 50 cc. of one-tenth molar pH 7.0 phosphate buffer and 200 milligrams of commercial "Takadiastase." Then separate 10 cc. portions of that homogenized liver mixture were added to 3 separate flasks containing respectively 100, 200 and 500 micrograms, of xanthopterin in 10 cc. of water. To the mixture in each flask, 1 cc. of benzene was added to prevent bacterial action. Each of the flasks was then stoppered and incubated at 37° C. for 18 to 24 hours. At the end of the incubation period, the flasks were unstoppered and autoclaved at 15 pounds pressure for ten minutes. Then the coagulated tissue in each flask was broken up with a spatula and the mixture in each of them diluted to 80 cc. and filtered under suction. The "folic acid" content in each filtrate was then determined microbiologically with *Lactobacillus casei* as the test organism according to the procedure of Landy and Dicken, Journal of Laboratory and Clinical Medicine, vol. 27, p. 1086 (1942). The "folic acid" of the three samples was found to be:

| Micrograms added xanthopterin | Folic acid content, gamma per gram |
|---|---|
| 100 | 0.38 |
| 200 | 0.49 |
| 500 | 0.56 |

While the homogenized liver was first adjusted to pH 7.0 in the preceding examples, the hydrogen ion concentration may be varied for suitable results follow from working on the alkaline side, for example, at around pH 8.1 as well as on the acid side, for example, around pH 6 and even as low as pH 5 or lower.

The invention is similarly applicable to other foodstuffs or comestibles of animal source since it is not restricted to the beef liver and not restricted to the single food animal. It includes poultry as well as products from the animals and poultry, as eggs and milk, and also embraces foodstuffs and comestibles of vegetable origin such as the various vegetables and fruits and nuts.

The amount of xanthopterin or uropterin to be employed may vary in a measure from one specific food material to another, but in general the optimum proportion of xanthopterin or uropterin to be employed is readily determined by a simple set of experiments such as that indicated above with the beef liver.

While the invention has been more particularly described by reference to xanthopterin or uropterin as an effective embodiment of the agent for increasing the available folic acids and preventing their destruction, the thus effective substance may be generally referred to as a xanthopterin-substance effective for preventing the destruction of or increasing the available content of folic acids.

Accordingly, the invention is not restricted to the method of enhancing the availability of folic acids in nutrient and comestible materials by treating them prior to use with a sufficient amount of xanthopterin-substance applicable for enhancing the folic acids content and preventing the destruction thereof in materials necessary as food for man and other animals. Thus, the invention also includes the new compositions comprising a material useful as food for man and other animals treated with a xanthopterin-like substance adapted to enhancing the available folic acids content thereof and to prevent the destruction of folic acids.

What is claimed is:

1. The process of improving the nutritional qualities of food products and vitamin preparations, both of which contain folic acid, which comprises treating such starting materials with a xanthopterin-substance adapted to enhance the available folic acids content of, and prevent the destruction of folic acids in, the starting materials.

2. The process of improving the nutritional qualities of food products and vitamin preparations, both of which contain folic acid, which comprises treating such starting materials with xanthopterin.

3. The process of improving the nutritional qualities of food products and vitamin preparations, both of which contain folic acid, which comprises treating such starting materials with xanthopterin at elevated temperatures above the atmospheric temperature and below temperature destructive of the starting material.

4. The process of improving the nutritional qualities of food products and vitamin preparations, both of which contain folic acid, which comprises treating such starting materials with xanthopterin at elevated temperatures above the atmospheric temperature and below temperature destructive of the starting material and at the superatmospheric pressures normally employed in pressure cooking of food materials.

5. The method of enhancing the available "folic acid" content of liver, which comprises adding xanthopterin to the liver and heating it to prepare the liver for consumption as food.

6. A composition useful as a nutritional and comestible material comprising a folic acid containing foodstuffs material with enhanced available folic acids content produced by treatment of the foodstuffs material with a xanthopterin-substance adapted to enhance the folic acids content of, and prevent folic acids destruction in, the starting material.

7. A composition useful as a nutritional and comestible material comprising a folic acid containing foodstuffs material and the reaction product of such material with a xanthopterin-substance adapted to enhance the folic acids content of, and prevent folic acids destruction in, the starting material.

8. A composition useful as a nutritional and comestible material comprising a folic acid containing foodstuffs material and the reaction product of such material with xanthopterin.

9. A composition useful as a nutritional and comestible material comprising liver and the reaction product of such material with xanthopterin.

ARNOLD D. WELCH.
LEMUEL D. WRIGHT.